United States Patent [19]

Chant et al.

[11] Patent Number: 4,648,421

[45] Date of Patent: Mar. 10, 1987

[54] VALVE DEVICE FOR CONTROLLING LIQUID FLOW

[75] Inventors: Nigel A. Chant, Bedfordshire; Richard W. E. Mosse, London; Kevin Bunce, Hertfordshire, all of England

[73] Assignee: Liquipak International B.V., London, England

[21] Appl. No.: 480,395

[22] Filed: Mar. 30, 1983

[30] Foreign Application Priority Data

Mar. 30, 1982 [GB] United Kingdom ................. 8209318

[51] Int. Cl.$^4$ ............................................ F16K 17/04
[52] U.S. Cl. ..................... 137/312; 137/494; 137/506; 137/516.27; 137/541; 141/116; 222/108; 222/453; 222/496; 239/453
[58] Field of Search ............ 137/312, 471, 483, 484.2, 137/484.4, 494, 496, 506, 516.27, 541; 141/115, 116, 117, 119; 222/108, 453, 496, 497, 571; 239/453; 251/210

[56] References Cited

U.S. PATENT DOCUMENTS

| | | | |
|---|---|---|---|
| 770,088 | 9/1904 | Moore | 137/541 |
| 2,156,498 | 5/1939 | Hinrichs | 137/312 |
| 2,413,916 | 1/1947 | Hallead | 141/117 |
| 2,439,832 | 4/1948 | Voit | 239/453 |
| 2,962,227 | 11/1960 | Whitehurst | 239/453 |
| 2,991,767 | 7/1961 | Candelise | 137/494 |
| 3,054,422 | 9/1962 | Napolitano | 137/516.27 X |
| 3,203,246 | 8/1965 | Horwitt | 137/494 X |
| 4,402,461 | 9/1983 | Mosse | 239/453 |

FOREIGN PATENT DOCUMENTS

| | | | |
|---|---|---|---|
| 0013132 | 7/1980 | European Pat. Off. | |
| 1550419 | 9/1969 | Fed. Rep. of Germany | 137/541 |
| 2505544 | 8/1976 | Fed. Rep. of Germany | 137/312 |

Primary Examiner—Robert G. Nilson
Attorney, Agent, or Firm—Wood, Dalton, Phillips, Mason & Rowe

[57] ABSTRACT

A valve device for use in filling cartons includes a tubular housing containing a valve member comprising a closure part co-operating with a valve seat at the lower extremity of the housing, and a driving part movably received with clearance in the housing. During the latter part of the opening movement of the valve member against a spring, the clearance increases smoothly and considerably, and the driving part reaches a force equilibrium position at which the clearance is considerable. Two grooves formed in the housing and the valve member immediately below the annulus of sealing bound an annular enclosed space for receiving liquid squeezed out downwardly at the valve seat.

4 Claims, 7 Drawing Figures

VALVE DEVICE FOR CONTROLLING LIQUID FLOW

BACKGROUND OF THE INVENTION

1. Field of the Invention

This invention relates to a valve device for controlling liquid flow, in particular for use in filling a carton.

2. Description of the Prior Art

European Patent Publication No. 0013132 discloses an aseptic packaging machine which includes a chain conveyor conveying cartons along a path in an aseptic chamber including an advance leg and a return leg each extending along the machine. Ultra-violet germicidal lamps extend over at least a major portion of the advance leg. Aseptic liquid is fed into the cartons by a filling device. After filling, the cartons are top-heated and sealed by a top-heating device and a top-sealing device. The only non-aseptic matter deliberately introduced into the chamber is the cartons. The chamber is cleaned internally by cleaning fluid from spray nozzles. The carton entry to and exit from the chamber have aseptic air curtains.

The filling device is particularly designed to prevent microbes obtaining access to the aseptic liquid product being supplied to the aseptic chamber. The filling device includes a mounting frame which mounts four stainless steel reciprocatory bellows having bottom walls which are reciprocatorally driven by respective reciprocatory plungers and having top flanges fixed to respective lower limbs of fixed T-unions. Respective upper limbs of the unions contain respective spring-loaded, non-return, inlet valves which open to allow downward flow through the limbs. Intermediate limbs of the respective unions are connected to respective arcuate pipes which curve downwardly towards the path of the cartons and which at their lower ends are connected to respective outlet nozzles which contain respective spring-loaded, non-return, outlet valves. The chains advance the cartons stepwise directly below the line of nozzles and a selected number of the bellows are operated each to deliver a predetermined dosage of long-life milk to the vertically upright cartons, the number of bellows operated being dependent upon the nominal capacity of the cartons. Thus, with each bellows being pre-set to deliver a half pint at each reciprocation, all four bellows are operated for cartons which can each hold one quart. On each bellows performing a pressure stroke, because the inlet valve in its union is held closed by its spring and by the milk pressure, the inlet valve is automatically opened against the action of its spring so that the bellows can draw in milk from an expansion chamber.

In a widely used design applicable to that machine, the nozzle would comprise a tubular housing and a valve member in the housing. The tubular housing is formed internally, at a location spaced an appreciable distance above its lower extremity, with a valve seat in the form of a downwardly-facing, frusto-conical surface. Immediately beyond this surface, the housing widens to form an expansion space and then narrows again to continue downwards as a cylindrical bore. The valve member comprises a disc-form driving part, a stem extending downwards from the driving part, and a closure part fixed to the lower end of the stem and having a frusto-conical surface co-axial with the housing and arranged to come face-to-face with the valve seat. This latter surface is formed with a co-axial annular groove containing an elastomeric O-ring for sealing against the valve seat. The valve member is movable axially between a closed condition in which the closure part is within the tubular housing and acts sealingly on the valve seat by way of the O-ring and an open condition in which the closure part is still within the housing but spaced downwards from the valve seat. The valve member is encircled by a closing spring urging the closure part into its closed position. The driving part is a downwardly diverging, frusto-conical disc co-axial with the housing, which has a downwardly diverging, frusto-conical, internal surface encircling the disc and of a cone angle equal to that of the disc. In the closed condition of the valve member, there is a very small clearance between the disc and this surface. The valve member is opened by the pressure differential between the pressure of the liquid upstream of the driving part and the pressure downstream of the driving part. When this pressure differential is sufficiently high to overcome the pressure of the spring, the valve member opens. As the valve member opens, the clearance width between the driving part and its complementary surface of the housing increases linearly. The driving part is considerably smaller in diameter than is the O-ring. The extent of compression of the spring determines the extent of opening of the valve member. The valve member includes a second stem extending downwardly from the closure part and widening at its lower end region to obturate the cylindrical bore in the closed condition of the valve member. In the open condition, the lower extremity of this stem is spaced downwards from the housing and the liquid can flow down therebetween. The valve member also includes two or more fins which extend upwardly from the lower end of the second stem and slide on the surface of the cylindrical bore. Were it not for the fins, in the open condition of the valve member, the liquid would flow from the valve member as a substantially unbroken tube of liquid. This would mean that air trapped within the tube of liquid and increasingly under pressure as the liquid level in the carton climbs would be forced to break through the tube of liquid to escape and in so doing would disturb the smooth flow of the liquid into the carton and cause splashing of liquid beyond the carton. The presence of the fins ensures that corresponding vents are formed along the tube of liquid through which vents air can flow without disturbing the flow of the liquid.

The nozzle described above has a number of disadvantages.

The extent of opening of the valve member is relatively unpredictable, because the clearance width between the driving part and its complementary surface of the housing increases continuously from the closed condition to the maximum open condition, so that the open position of the driving part can be almost anywhere along such complementary surface, depending upon the pressure differential upon the driving part, which itself depends upon the velocity and viscosity of the liquid. Such unpredictability can lead to difficulties in designing and operating the machine to cope with various liquids and various containers, particularly since there is an optimum range of rate of flow of liquid into the carton. Another disadvantage is that, as the valve member reaches its closed condition under the action of the return spring its speed is relatively high and the closure part strikes the valve seat at speed, causing liquid at the valve seat to be spat out in various directions. In addition, the housing has an appreciable area of its internal surface below the annulus of sealing between the valve seat and the O-ring, and this area is normally wetted by contact with the liquid from the open outlet valve, so that there is a risk that liquid will drip from the nozzle even when the outlet valve has been fully closed and thus drip onto the exteriors of cartons or onto the conveyor forwarding the cartons. Such dripping is obviously undesirable.

U.S. Pat. No. 2,962,227 discloses a fuel injection nozzle comprising a tubular body internally screwthreaded to receive a connector nipple having an internal bore terminating at its lower end in a cylindrical chamber. Located in the chamber is a detachable tubular valve housing through which extends a stem carrying at its lower end a valve closure member of apparently frusto-conical form co-operating with an apparently frusto-conical valve seat within the outlet of the housing. The upper end of the stem is externally screwthreaded to receive an internally screwthreaded metal disc formed with angularly drilled apertures each inclined inwardly and downwardly and having its lower end spaced from the stem. These apertures permit fuel to pass to beneath the disc. The valve stem is maintained in position on the disc by a lock nut. The central bore of the valve housing is counterbored to receive a distance piece and a helical spring bearing at its lower end on the distance piece and at its upper end against the underside of the disc. In the bottom of the chamber and underneath the disc is a ring of elastomeric material which is normally separated from the underside of the disc by a small free space. When the nozzle is operated at low delivery rates, fuel enters the chamber and passes through the apertures in the disc and down to the valve seat. The fuel pressure thereby built up downstream of the disc ultimately forces the valve closure member to open against the force of the spring, so that the fuel is injected, but a small free space still remains between the elastomeric ring and the disc. However, at high delivery rates, the valve opens more, thus pressing the disc against the ring and thereby closing the free space. Thereupon, less of the underside of the disc is exposed to the fuel pressure, so that the valve is maintained more reliably in that position.

The fuel injection nozzle just described is clearly not designed for use with liquids of a relatively wide range of viscosities, since the higher the viscosity of the liquid, the greater would be the tendency for the disc to contact the ring at relatively low delivery rates. Furthermore, if an enlarged such nozzle were to be used in the filling of cartons, as the wetted, apparently frusto-conical surfaces of the valve closure member and the valve seat came together as the valve closure member reached its closed position, they would squeeze out downwardly from between them drops of liquid which would be liable to drop onto the cartons or the machine parts below them. A further disadvantage would be that the issuing of liquid from immediately adjacent to the lower end of the housing, which would occur irrespective of the extent of opening of the valve member, would mean that a container conveyed along sideways to immediately beneath the housing would be likely to have liquid splashed onto any top sealing surfaces thereof and over onto the outside of the container, which would obviously be disadvantageous.

SUMMARY OF THE INVENTION

According to one aspect of the present invention, there is provided a valve device for controlling liquid flow, comprising a tubular housing having a substantially cylindrical internal surface followed longitudinally of the housing by a second internal surface spaced further from the axis of said housing than is said substantially cylindrical internal surface, a valve member, extending substantially co-axially in said housing and movable relative to said housing and axially thereof between an open condition in which liquid can flow between said valve member and said housing and a closed condition, and biassing means urging said valve member into said closed condition, said valve member including an obturating portion which, in said closed condition, substantially obturates said tubular housing at a location along said substantially cylindrical internal surface, and which, in its opening movement, sweeps along said substantially cylindrical internal surface while closely encircled by the same and later sweeps along said second internal surface and arrives at an equilibrium position at a location along the latter surface in which liquid is flowing through between said obturating portion and said second internal surface and in which the total force tending to open said valve member is balanced by the total force tending to close the same.

This arrangement of a substantially cylindrical internal surface followed by an enlargement provided by the said second internal surface enables the open position of the valve member to be relatively predictable, so that the valve device can be made to cope with liquids of considerably differing viscosities. Another advantage is that the possibility of too little opening of the valve member, which would mean that the liquid outlet would be of too small a throughflow area, so that the liquid could spurt out at a high velocity at the top of the container to be filled, with wetting of top sealing surfaces and even of the outside surface of the container, can be avoided.

According to another aspect of the present invention, there is provided a valve device for controlling liquid flow, comprising a tubular housing, an annular valve seat on said housing and substantially co-axial therewith and bounding an internal surface of said housing and a valve member including a valve closure part and extending substantially co-axially in said housing and movable relative to said housing downwardly axially thereof from a closed condition in which said closure part acts sealingly against said valve seat round an annulus of sealing to an open condition in which said closure part is spaced from said valve seat, said housing having wetted internal surface portions which when liquid passes downwardly through said housing when said closure part is open are normally contacted by said liquid and said member having wetted external surface portions which when said liquid passes downwardly through said housing when said closure part is open are normally contacted by said liquid, some of said wetted internal surface portions of said housing below said annulus of sealing or some of said wetted external surface portions of said valve closure part below said annulus of sealing bounding an annular groove substantially co-axial with said housing for receiving and retaining liquid squeezed out downwardly at said valve seat.

Owing to the retention of the squeezed-out drops of liquid in the annular groove, dripping of liquid from the closed valve device can be virtually eliminated. Although there can be only one groove, and that in either the housing or the closure part, there are preferably two grooves, one in the housing and the other in the closure part.

According to a further aspect of the present invention, there is provided a valve device for controlling liquid flow, comprising a tubular housing having a substantially cylindrical internal surface followed longitudinally of the housing by internal surface means which is of slightly greater diameter compared to said substantially cylindrical internal surface and followed longitudinally of the housing by an annular valve seat substantially co-axial with said housing, a valve member including a valve closure part and extending substantially co-axially in said housing and movable relative to said housing and axially thereof between an open condition in which liquid can flow between said valve member and said housing and a closed condition in which said closure part acts sealingly against said valve seat, and biassing means urging said valve member into said closed condition, said valve member including an obturating portion which, in said closed condition, substantially obturates said tubular housing at a location along said substantially cylindrical internal surface, and which, in its opening movement, firstly sweeps along said substantially cylindrical internal surface while closely encircled by the same and then sweeps along said internal surface means, said internal surface means extending downwardly from near to the closed position of said obturating portion.

During the closing stroke of the valve member, the slight clearance between the obturating portion and the said internal surface means allows liquid trapped between the obturating portion and a non-return valve upstream of the valve device to escape to downstream of the obturating portion, so permitting relatively fast return of the valve member. However, since the clearance between the housing and the obturating portion decreases as the valve member nears its closed condition, the moving valve member is thereupon slowed, so that the closure part closes less forcefully under the action of the biassing means, so mitigating any tendency for the liquid to be spat out.

According to a yet further aspect of the present invention, there is provided a valve device for controlling liquid flow, comprising a tubular housing, an annular valve seat on said housing and substantially co-axial therewith and bounding an internal surface of said housing and a valve member including a valve closure part and extending substantially co-axially in said housing and movable relative to said housing downwardly axially thereof from a closed condition in which said closure part acts sealingly against said valve seat round an annulus of sealing to an open condition in which said closure part is spaced from said valve seat, said valve member also including fin means extending upwards from said closure part and a tubular part co-axial with said housing and a sliding fit in said internal surface, said tubular part being fixed to said fin means and downwardly terminating short of said closure part, whereby said tubular part and said closure part bound between them liquid outlet means which in said open condition is spaced from said housing.

Since the liquid outlet means is spaced downwards from the housing in the open condition, a container arranged with its top adjacent to the bottom of the housing can receive at least most of the liquid from the valve device at a level below the top of the container.

BRIEF DESCRIPTION OF THE DRAWINGS

In order that the invention may be clearly understood and readily carried into effect, reference will now be made, by way of example, to the accompanying drawings, in which.

DESCRIPTION OF THE PREFERRED EMBODIMENTS

The machine which will now be described constitutes a development of the machine described in the co-pending U.S. patent application Ser. No. 279,343 of Liquipak International Inc., now U.S. Pat. No. 4,402,461.

Figure 1:
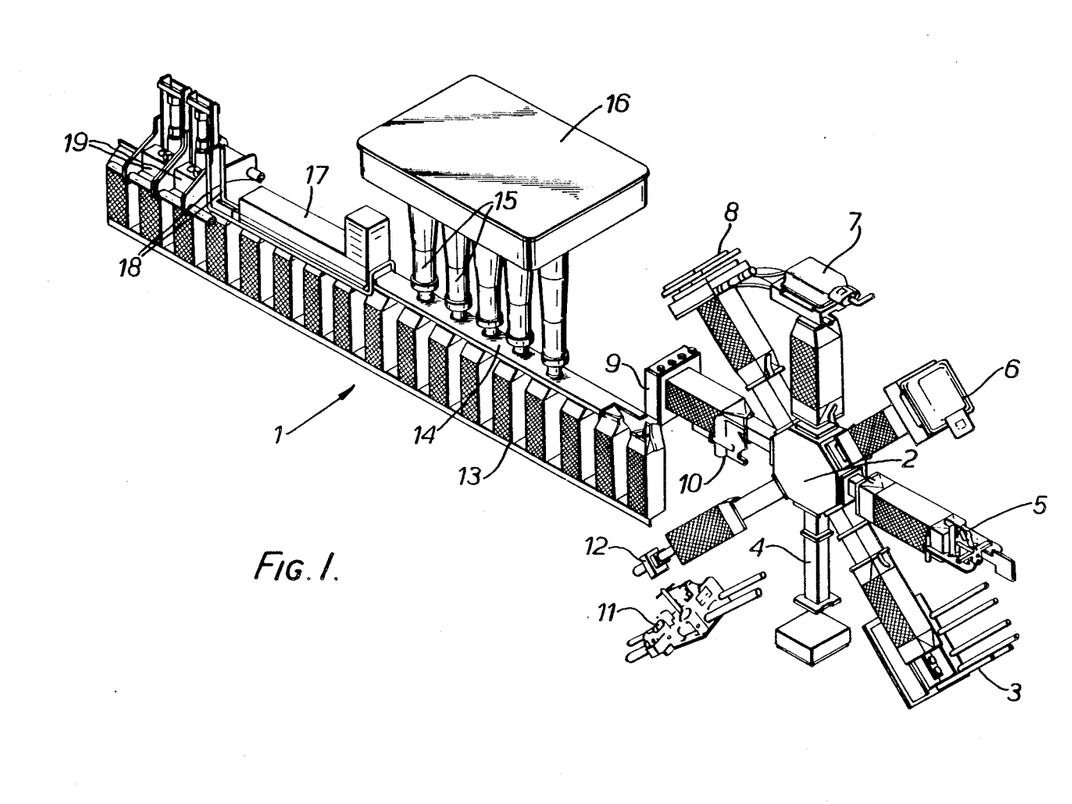
FIG. 1 shows a diagrammatic perspective view of a packaging machine.

Referring to the drawings, the machine 1 for carrying out packaging includes at one end of the machine a conventional device 2 for pre-forming (including bottom-sealing) gable-topped cartons. The open-topped pre-formed cartons are taken to the other end of the machine by means of a chain system (not shown), which advances the open-topped cartons step-wise and in a vertically upright condition.

Vacuum cups on a carton picker (not shown) pull a single carton blank consisting of paperboard coated on both faces with thermoplastics, from a carton basket 3, open it and place it in position in loading guides. A hydraulically operated loader chain pushes the open carton blank onto a forming mandrel 4 which then indexes to the next position.

A bottom breaker 5 closes up on the carton bottom and folds it on pre-scored lines.

At the next two index positions, the carton is placed under bottom heaters 6 and 7, which heat the plastics in preparation for bottom sealing.

As the mandrel indexes to the next station, the carton passes through top folding rails and stops in position under a bottom press 8. The bottom press advances and cools and seals the carton bottom.

At the next index position, a bottom press 9 advances and cools and seals the carton bottom again, and top breakers 10 break the carton top on pre-scored fold lines.

At the next station, the carton is pulled off the mandrel by an unloader 11 and is placed on an unloader vacuum cup on a transfer tube 12.

The transfer tube then tilts the carton through 45° into a filler section 13, at which time a carton lock swings down and holds the carton in place.

The carton is indexed through the section 13 by the chain system.

A spreader plate 14 engages the carton top and guides the carton into position under a row of five dosaging filling devices 15 connected to a supply tank 16 containing milk, for example. The carton is indexed through five stages of filling at the five devices, and receives approximately one-fifth fill at each station, if all the devices 15 are in use.

At the next station, the filled carton top is heated under an electric top heater 17. The carton then passes through cooled top folding rails 18 and is sealed by sealer jaws 19. The filled and sealed carton is then indexed out onto an accumulating table.

The machine as so far described is of a conventional type.

Figure 2:
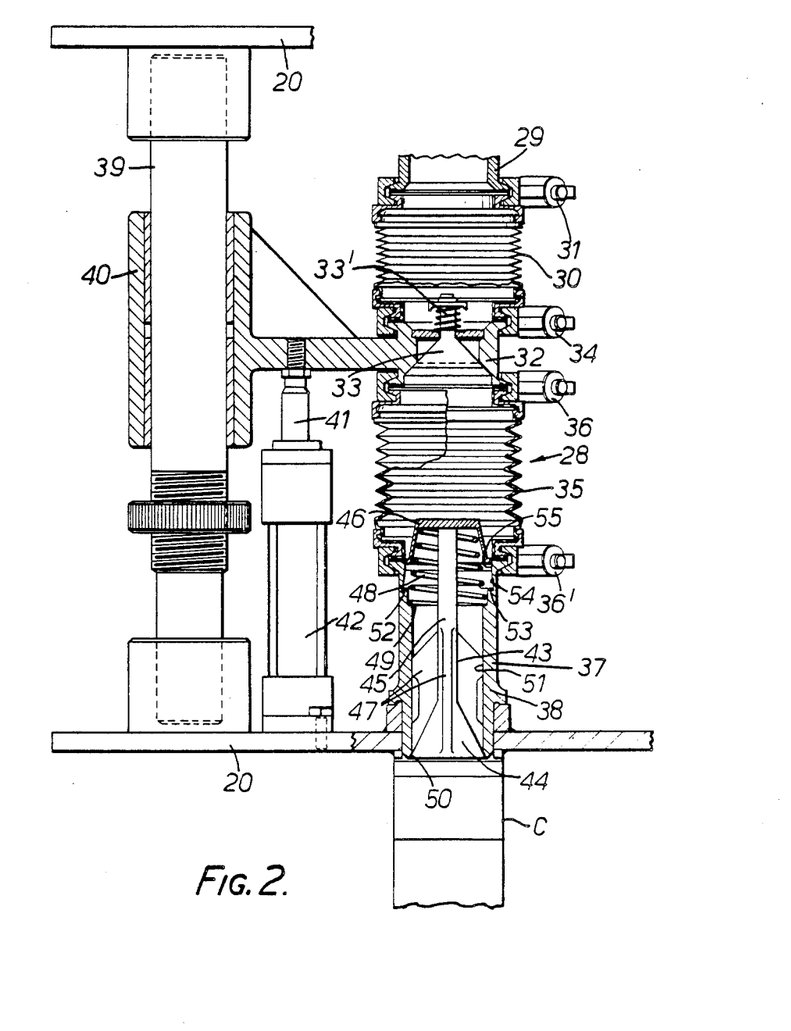
FIG. 2 shows a sectional end elevation of the machine.

Referring to FIG. 2, each filling device 15 includes a mounting frame 20 which mounts a row of five vertical ducts 28 each consisting of an uppermost ducting section 29 connected to the supply tank 16, an upper bellows 30 attached at its upper end to the section 29 by a clamp 31, a lower ducting section 32 containing a non-return inlet valve 33 and attached at its upper end by means of a clamp 34 to the bellows 30, a lower bellows 35 connected at its upper end by means of a clamp 36 to the section 32, and a nozzle 37 connected at its upper end by means of a clamp 36' to the bellows 35. The bellows 30 and 35 are of polypropylene and have been formed by blow-moulding. The nozzle 37 includes a vertical tubular housing 38 fixed in the mounting frame 20. The mounting frame 20 includes five vertical pillars (of which one is seen in FIG. 2 and referenced 39). Vertically slidably mounted on each pillar is a bracket 40 integral with the ducting section 32 and connected to a piston rod 41 of an hydraulic or pneumatic ram 42 which acts between the frame 20 and the bracket 40 and of which the cylinder is fixed to the frame 20. There is thus one ram for each vertical duct 28. Arranged co-axially in each housing 38 is a valve member 43 which consists of a frusto-conical closure part 44, a vertical central stem 45 extending upwardly from the part 44, a driving part 46 of inverted cup shape attached to the upper end of the stem 45, and four vertical fins 47 extending upwardly from the part 44 and arranged to slide on the internal surface of the housing 38 in order to guide movement of the valve member 43 in the housing 38. A spiral compression spring 48 acting between an internal, upwardly facing shoulder 49 of the housing 38 and the base of the inverted cup-shaped part 46 urges the valve member 43 into a closed condition shown in FIGS. 2 and 3, in which the outer peripheral edge zone of the frusto-conical part 44 bears face-to-face directly against a corresponding frusto-conical valve seat 50 formed at the lower extremity of the internal surface of the housing 38. The fins 47 terminate as closely as practical to the outer peripheral end zone of the part 44, while leaving an adequate seating. From the valve seat 50, the internal surface of the housing 38 continues upwards as a circular cylindrical bore surface 51 and thence as the upwardly facing surface of the shoulder 49. A short distance above the shoulder 49 is another upwardly-facing shoulder 52. Arranged on the shoulder 52 are upstanding lugs 53 integral with the housing, which serve as abutments which co-operate with the outer peripheral edge zone of the part 46 to provide a positive limit to the maximum extent of opening of the valve member 43 and thus define the fully open position of the member 43. The housing 38 has a co-axial downwardly diverging frusto-conical internal surface 54 at an angle of about 10° to the axis of the housing 38 and, immediately above that surface, a co-axial cylindrical internal surface 55 of a diameter equal to the minimum diameter of the surface 54. The outer peripheral edge zone of the part 46 is a sliding fit in the surface 55.

Figure 3:
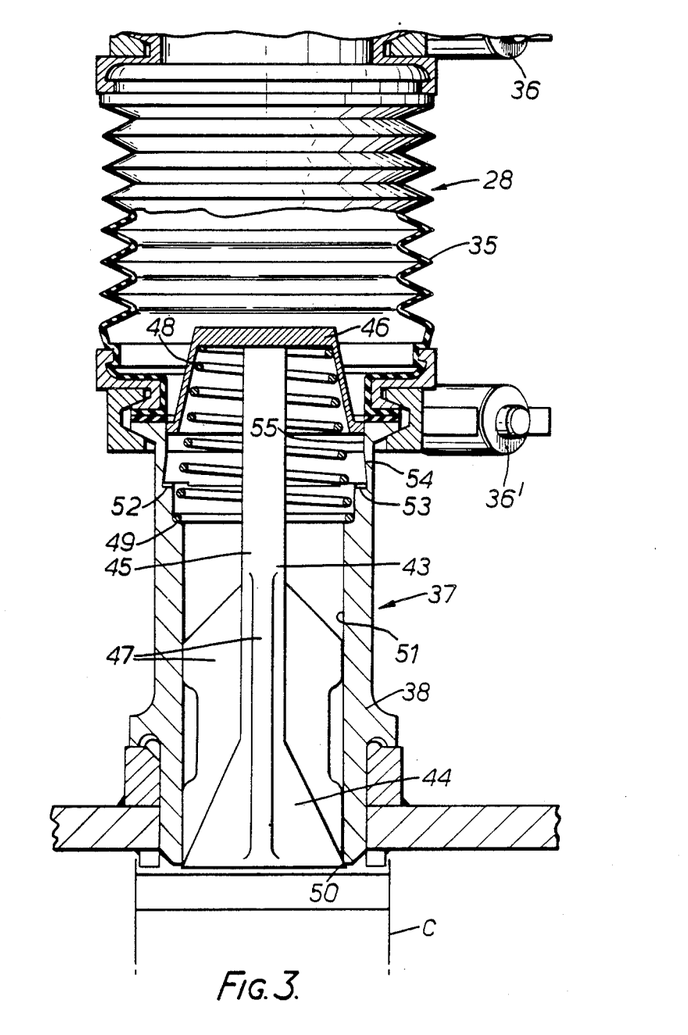
FIG. 3 shows a detail of FIG. 2.

In the following description of the operation of the filling device, it will be assumed that in the initial condition of the device the valve member 43 is in the closed condition shown, and that both of the bellows 30 and 35 are full of liquid to be fed to the nozzle 37.

The ram 42 displaces the bracket 40 upwards from the position shown. The pressure of the liquid in the bellows 30 on the inlet valve 33 opens the valve against the action of its closing spring 33' and the liquid flows into the bellows 35 as the ducting section 32 moves upwards and compresses the bellows 30. Upon the ram 42 reaching its upper end position and beginning to return downwards, the valve 33 closes automatically and the liquid in the bellows 35 is pressed by the ram 42 against the driving part 46, so that the member 43 moves downwards against the action of the spring 48. The outer peripheral edge zone of the part 46 therefore sweeps along the surface 55 and the part 44 opens; then that zone sweeps along the surface 54 so that a continuously widening gap is formed between that zone and the surface 54 through which gap liquid flows downwards at a correspondingly increasing rate until the member 43 arrives at a position at which the upward force on the member 43 is in equilibrium with the downward force thereon. The maximum possible downward movement of the member 43 is determined by the part 46 abutting against the lugs 53, whereat the closure part 44 is opened to its maximum extent. Under the pressure of the ram 42, the liquid in the bellows 35 continues to flow through the gap between the part 46 and the surface 54. The liquid flow through the gap is deflected inwardly by the shoulder 52. Thus the shoulder 52 changes the velocity of the liquid flow from the gap to one the predominant component of which is axial of the housing 38 to one the predominant component of which is inwardly radial of the housing 38. The liquid flow deflected from the shoulder 52 thus interferes with itself. The flow proceeds down the housing 38 and flows in substantially separate streams among the fins 47. Each of the fins 47 is made of such width, at least at its lower end, that the streams of liquid do not re-combine immediately on leaving the fins 47, but instead leave between them vents downstream of the outer peripheral edge zone of the part 44, through which vents air can flow from the inside to the outside of the virtual tube of liquid formed.

It will be appreciated that the equilibrium position of the member 43 is dependent upon the downward pressure, on the part 46, which is itself dependent upon the viscosity of the liquid, and thus that the nozzle 37 constitutes a self-adjusting throttle. Moreover, owing to the provision of the cylindrical surface 55, the member 43 has to perform a considerable minimum downward movement before the equilibrium position can be reached. Therefore one and the same nozzle 37 can be used with a wide range of individual liquids without either the rate of flow of the liquid from the nozzle or the extent of opening movement of the member 43 varying greatly.

Figure 4:
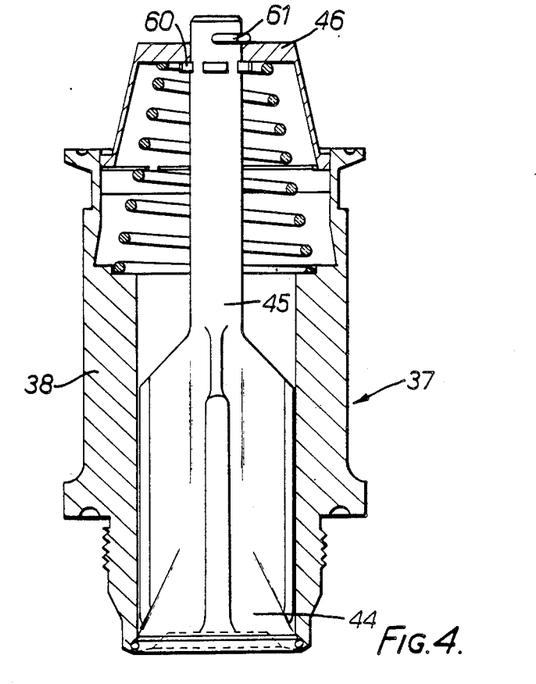
FIG. 4 is a view similar to FIG. 3 of a modified version of a nozzle of the machine.
Figure 5:
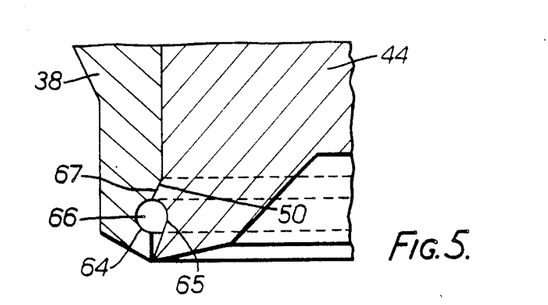
FIG. 5 shows a detail of FIG. 4.
Figure 6:
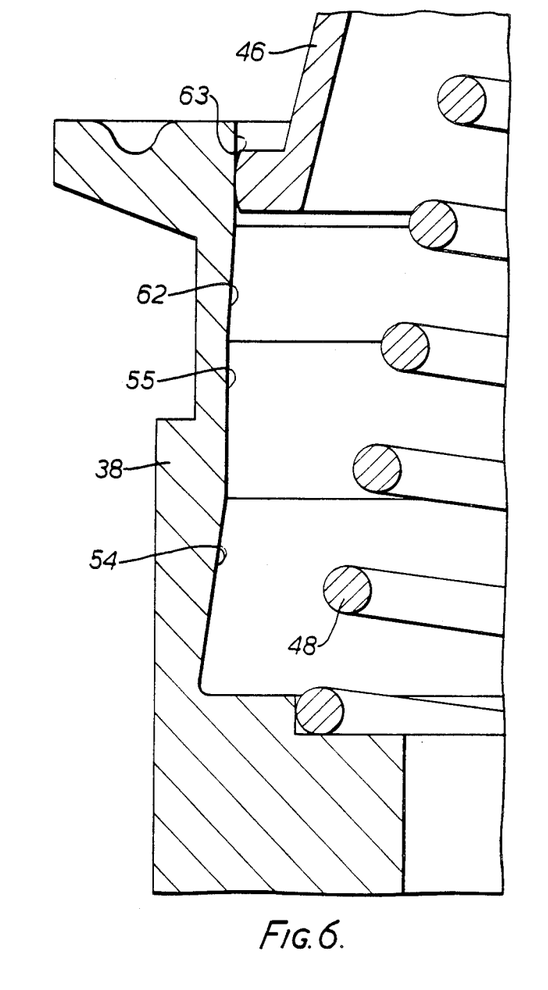
FIG. 6 shows another detail of FIG. 4.

Referring to FIGS. 4 to 6, the nozzle 37 shown therein differs in a number of ways from that described with reference to FIGS. 2 and 3. Firstly, the driving part 46 is received with clearance on the stem 45, is supported thereon by a ring of lugs 60 protruding from the stem and is releasably retained thereon by a spring clip 61 mounted in a diametral bore in the stem 45. Secondly, the cylindrical surface 55 terminates short of the uppermost position of the part 46 and is preceded downwardly by a co-axial downwardly diverging frusto-conical internal surface 62 which is of a maximum diameter equal to the diameter of the surface 55 and which is inclined at about 2° to the axis of the housing 38, the surface 62 being itself preceded downwardly by a co-axial circular cylindrical internal surface 63 of a diameter equal to the minimum diameter of the surface 62. The outer peripheral edge zone of the part 46 is a sliding fit in the surface 63. The slight clearance between the surface 55 and the part 46 ensures that, during the major part of the closing stroke of the member 43, the liquid trapped between the closed non-return valve 33 and the part 46 can escape to below the part 46, so that the member 43 can move rapidly upwards. Since the surface 62 provides a narrowing of the slight clearance between the part 46 and the housing 38 as the part 46 approaches its uppermost position shown in FIGS. 4 and 6, the throttling effect thereby obtained slows the moving valve member 43, so that the closure part 44 closes relatively slowly and does not cause the liquid to be spat out at the valve seat 50. Thirdly, the valve seat 50 is formed a very short distance above the lower extremity of the internal surface of the housing 38 and there is provided immediately below the valve seat 50 an annular groove 64 of semi-circular cross-section and formed in that internal surface. Moreover, an annular groove 65 is formed in the external surface of the part 44 immediately above the lower extremity of that external surface. The groove 65 has an upper side of circular cross-section and a lower side of straight cross-section merging tangentially into the upper side. The grooves 64 and 65 thereby bound between them an annular enclosed space 66 in the closed position of the part 44 shown in FIGS. 4 and 5. In use of the nozzle, the coming together of the wetted valve seat 50 and the wetted, co-operating, frusto-conical, external surface 67 of the part 44 as the part 44 closes squeezes out drops of liquid downwardly. The advantage of the provision of the enclosed space 66 is that these drops collect and remain trapped in the space 66, partly through surface tension effects.

Figure 7:
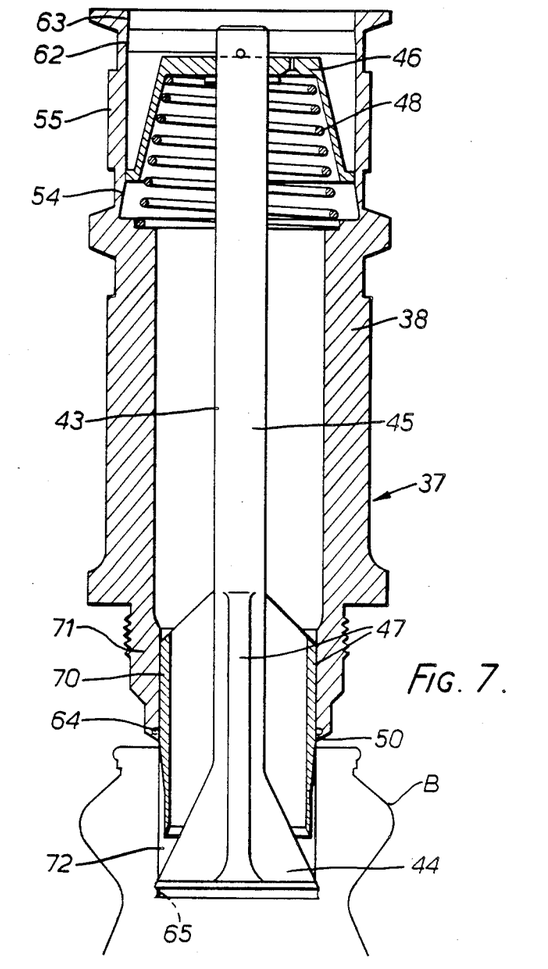
FIG. 7 shows a view similar to FIG. 3 of another modified version of the nozzle.

The nozzle 37 shown in FIG. 7 differs from those shown in FIGS. 3 and 4 chiefly in that the fins 47 are fixed at their outer peripheries to a circular sleeve 70 which is co-axial with the housing 38. The upper part of the outer periphery of the sleeve 70 is a sliding fit in a bottom part 71 of the housing 38, whilst the lower part of the outer periphery tapers slightly downwards. The lower end of the sleeve 70 is spaced upwardly from the closure part 44 and so leaves a ring of arcuate liquid outlets 72 through which the liquid can flow into the container in this case a bottle B to be filled. This arrangement has the advantage of ensuring that, when the valve member 43 is in its open container, the liquid exits into the condition B at a location significantly below the top of the container, so reducing any risk of the liquid splashing onto the top sealing surfaces of the container or over onto the outside of the container. Since, compared to the versions of FIGS. 3 and 4, the valve member 43 has to penetrate farther into the container before a considerable liquid flow is desired, the surface 55 is of a much greater dimension axially of the housing 38.

The machine equipped with the nozzle of FIG. 7 has the following advantageous features of its filling cycle, some of which are also present with the nozzles of FIGS. 3 and 4.

(i) relatively fast opening of the valve member 43 to an open condition in which the position of the closure part 44 is predictable within very narrow limits, (ii) filling without considerable turbulence and without significant wetting of the top sealing surfaces or of the outside surfaces of the container, (iii) relatively fast closing of the member 43 to near to its closed condition, (iv) relatively slow further closing of the member 43 into its closed condition, and (v) remaining closed in a drip-free manner.

We claim:

1. A valve device for controlling liquid flow comprising a tubular housing, an annular valve seat on said housing and substantially co-axial therewith and bounding an internal surface of said housing and a valve member including a valve closure part and extending substantially co-axially in said housing and movable relative to said housing downwardly axially thereof from a closed condition in which said closure part acts sealingly against said valve seat round an annulus of sealing to an open condition in which said closure part is spaced from said valve seat, said housing having wetted internal surface portions which when liquid passes downwardly through said housing when said closure part is open are normally contacted by said liquid and said valve member having wetted external surface portions which when said liquid passes downwardly through said housing when said closure part is open are normally contacted by said liquid, at least one of said wetted internal surface portions of said housing below and thus downstream of said annulus of sealing and said wetted external surface portions of said valve closure part below and thus downstream of said annulus of sealing bounding an annular groove substantially co-axial with said housing for receiving and retaining liquid squeezed out downwardly at said valve seat, said groove, when said closure part is in said closed condition, forming part of a substantially enclosed space between said housing and said closure part for receiving and retaining liquid squeezed out downwardly at said valve seat, and said space extending downwardly from immediately adjacent to said valve seat to the lower extremities of said housing and said valve member, whereby neither said housing nor said valve member has any substantial wetted surface portions below the lowermost extremity of said space.

2. A device according to claim 1, wherein said space comprises respective grooves formed in said housing and in said closure part opposite each other.

3. A device according to claim 2, wherein one of said grooves comprises an upper side of circular cross-section and a lower side of straight cross-section merging tangentially into said upper side.

4. A valve device for controlling liquid flow, comprising a tubular housing having a substantially cylindrical internal surface comprising a first cylindrical internal surface, a divergent internal surface which is of a form gently divergent in a downstream sense from a diameter substantially equal to that of said first cylindrical internal surface to a slightly greater diameter and which follows said first cylindrical internal surface longitudinally of said housing, and a second cylindrical internal surface of slightly greater diameter and following said divergent internal surface, said divergent internal surface and said second cylindrical internal surface being of an overall axial length equal to most of the axial length of said substantially cylindrical internal surface means said substantially cylindrical internal surface followed longitudinally downstream of the housing by a wider internal surface spaced further from the axis of said housing than is said substantially cylindrical internal surface, a valve member extending substantially co-axially in said housing and movable relative to said housing and axially thereof between an open condition in which liquid can flow between said valve member and said housing and a closed condition, and biasing means urging said valve member into said closed condition, said valve member including an obturating portion which, in said closed condition, substantially obturates said tubular housing at a location along said substantially cylindrical internal surface, and which, in its opening movement, sweeps along said substantially cylindrical internal surface while closely encircled by the same with small clearance over at least most of the axial length of the substantially cylindrical internal surface to allow liquid flow between said obturating portion and said substantially cylindrical internal surface and later sweeps along said wider internal surface and arrives at an equilibrium position at a location along the latter surface in which liquid is flowing through between said obturating portion and said wider internal surface and in which the total force tending to open said valve member is balanced by the total force tending to close the same, the axial length of said wider internal surface being equal to a minor proportion of the maximum stroke of said valve member.

* * * * *